United States Patent
Quintana et al.

(10) Patent No.: US 10,326,911 B2
(45) Date of Patent: Jun. 18, 2019

(54) MITIGATING DOT PLACEMENT ERRORS FOR A PRINT JOB

(71) Applicant: Hewlett-Packard Development Company, L.P., Houston, TX (US)

(72) Inventors: Jason Quintana, Brush Prairie, WA (US); Tsuyoshi Yamashita, Corvallis, OR (US); Matthew A Shepherd, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/518,197

(22) PCT Filed: Oct. 14, 2014

(86) PCT No.: PCT/US2014/060528
§ 371 (c)(1),
(2) Date: Apr. 10, 2017

(87) PCT Pub. No.: WO2016/060652
PCT Pub. Date: Apr. 21, 2016

(65) Prior Publication Data
US 2017/0310852 A1    Oct. 26, 2017

(51) Int. Cl.
*H04N 1/405*    (2006.01)
*G06F 3/12*    (2006.01)
(Continued)

(52) U.S. Cl.
CPC ......... *H04N 1/4055* (2013.01); *G06F 3/1234* (2013.01); *H04N 1/52* (2013.01); *H04N 1/047* (2013.01); *H04N 1/4052* (2013.01)

(58) Field of Classification Search
CPC .... H04N 1/4055; H04N 1/047; H04N 1/4052; G06F 3/1234
See application file for complete search history.

(56) References Cited

U.S. PATENT DOCUMENTS

| 5,973,803 A | 10/1999 | Cheung et al. |
| 6,501,564 B1 | 12/2002 | Schramm et al. |

(Continued)

FOREIGN PATENT DOCUMENTS

EP    1648153    4/2006

OTHER PUBLICATIONS

Zhang, Y. et al., "Plane-dependent Error Diffusion on a GPU," (Research Paper), Nov. 13, 2011, 2012—Plane-Dependent-ED-GPU. pdf. ~ 10 pages.

*Primary Examiner* — Quang N Vo
(74) *Attorney, Agent, or Firm* — HP Inc. Patent Department (57) ABSTRACT

A system, method, and non-transitory computer readable medium are disclosed for mitigating dot placement errors for a given print job. The method includes processing tone values on a per pixel basis to determine whether to implement plane dependence. Plane independence is implemented if the tone value exceeds a predetermined threshold. The method may be performed on a pixel by pixel basis and/or a print object or region basis. Determining whether to implement plane dependence may involve de-asserting or partially de-asserting a plane dependence component of an executed half-toning instruction between sequentially processed color planes of a printing system.

15 Claims, 7 Drawing Sheets

(51) Int. Cl.
    *H04N 1/52*     (2006.01)
    *H04N 1/047*     (2006.01)

(56) References Cited

U.S. PATENT DOCUMENTS

| | | |
|---|---|---|
| 6,661,533 B1 | 12/2003 | Bhaskar et al. |
| 6,870,645 B1 * | 3/2005 | Schramm ............... H04N 1/52 |
| | | 358/3.06 |
| 8,760,725 B1 | 6/2014 | Keithley |
| 2003/0090728 A1 | 5/2003 | Schramm et al. |
| 2005/0083541 A1 | 4/2005 | Clark et al. |
| 2009/0237433 A1 | 9/2009 | Miramanda et al. |

* cited by examiner

MITIGATING DOT PLACEMENT ERRORS FOR A PRINT JOB

BACKGROUND

Several causes contribute to dot placement errors during print operations, some arising from the printer, others from the print head. For example, dot placement errors can be caused by scan axis irregularities, paper slip, paper shape and coarseness, nozzle misalignment, and even air flow.

BRIEF DESCRIPTION OF THE DRAWINGS

The disclosure herein is illustrated by way of example, and not by way of limitation, in the figures of the accompanying drawings in which like reference numerals refer to similar elements and in which.

DETAILED DESCRIPTION

Example printer systems are provided that implement hybrid plane dependent half-toning in order to mitigate dot placement errors on executed print jobs. The examples can process print jobs by de-asserting aspects of plane dependency or de-asserting plane dependency entirely when a tone value of a given area (region or pixel level) of the print job exceeds a predetermined threshold.

Examples described herein may further mitigate and/or at least partially prevent dot placement errors or the visual impact of dot placement errors for a print job. Example methods include determining, for each pixel of a print job, whether to execute plane dependence, partial plane dependence, or plane independence. For example, for each respective pixel, an input is received identifying a tone value (i.e., color density) corresponding to a number of dots to be dispersed upon the pixel. In examples, based on the tone value, a determination is made regarding how to assert plane dependence or plane independence on the respective pixel. For example, if the identified tone value exceeds a predetermined threshold, plane dependence can be de-asserted. In such examples, plane independence for the respective pixel is implemented and the pixel is processed accordingly.

One or more examples further provide for a method in which plane dependence is determined for each color plane of a plurality of sequentially processed color planes for a respective pixel. As an example, for implementations involving a Black-Cyan-Magenta-Yellow (KCMY) printer, the plurality of sequentially processed color planes include, in sequential order, a black color plane, a cyan color plane, a magenta color plane, and a yellow color plane.

For the respective pixel, sequential color planes are processed to determine whether a combined tone value exceeds a predetermined threshold. There may be multiple thresholds, each associated with a different type of plane dependence. Accordingly, a plane dependent component of a half-toning instruction may be modified, or de-asserted, based on the determined or measured combined tone value. Thus, in response to determining that the combined tone value does not exceed the predetermined threshold, the given color plane can be processed in accordance with a half-toning instruction implementing plane dependence throughout. Such processing may involve one-way or two-way plane dependence. However, in response to determining that the combined tone value does exceed a predetermined threshold, the plane dependence component of the half-toning instruction may be de-asserted within the sequential color plane dependence process (i.e., between respective color planes, resulting in some colors being plane dependent and some colors plane independent).

One or more examples provide for a counter which performs a tone value count for each pixel. Accordingly, determining whether the combined tone value exceeds the predetermined threshold can comprise maintaining a tally for the combined tone value in the sequential order.

Among other benefits, examples described herein achieve a technical effect in which uncorrected dot placement errors, contributed by way of systemic and/or random anomalies during print job processing and execution, are mitigated to produce higher quality images. In accordance with such technical effect, examples are provided that utilize existing half-toning techniques to mitigate such errors, thereby allowing for compatibility and flexible extension to current printing devices and half-toning architectures.

Examples described herein provide that methods, techniques, and actions performed by a computing device may be implemented as hardware, or a combination of hardware (e.g., processor(s)) and executable instructions (e.g., stored on a machine-readable storage medium). These instructions can be stored in a single or multiple memory resources of the computing device. A performed step may or may not be automatic.

Examples described herein may be performed by way of any combination of hardware and programming to implement the functionalities of the computing engines described herein. In examples described herein such combinations of hardware and programming may be implemented in a number of different ways. For example, the programming for the computing engines may be processor executable instructions stored on at least one non-transitory machine-readable storage medium and the hardware for the computing engines may include at least one processing resource to execute those instructions. In such examples, the at least one machine-readable storage medium may store instructions that, when executed by the at least one processing resource, implement the computing engines of such examples.

Furthermore, examples described herein may be implemented through the use of instructions that are executable by a processor. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices, or tablets), and magnetic memory. Computers, terminals, and network enabled devices are examples of machines and devices that utilize processors, memory, and instructions stored on computer-readable mediums. Additionally, examples may be implemented in the form of computer-programs, or a non-transitory computer usable carrier medium capable of carrying such a program.

PRINTER SYSTEM

Figure 1A:
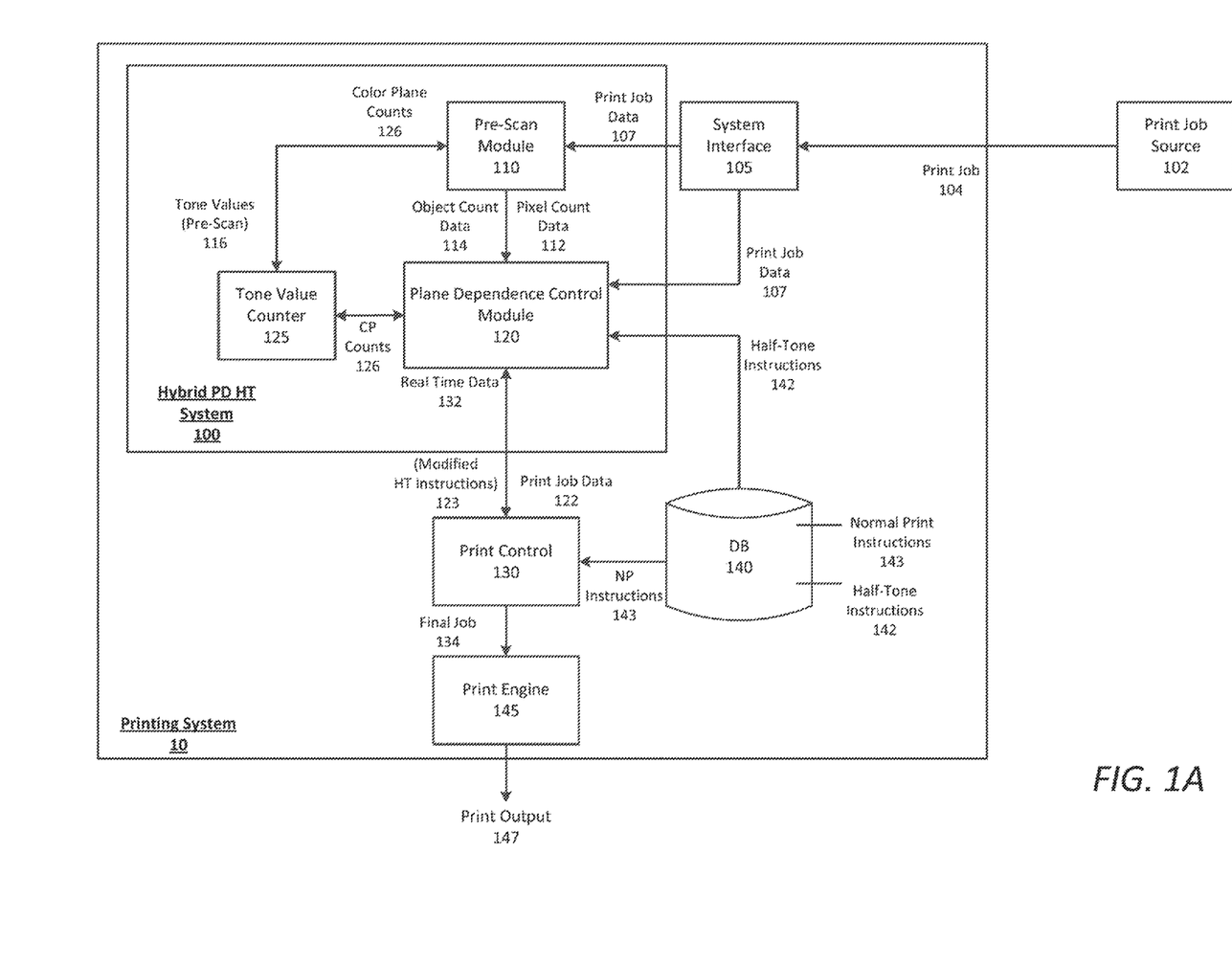
FIG. 1A is an example a printer system for implementing a hybrid plane dependent half-toning process as disclosed herein.

FIG. 1A is an example a printer system for implementing a hybrid plane dependent half-toning process as disclosed herein. An example such as described with FIG. 1A recognizes that plane dependent, tone dependent half-toning provides for exceptional dot patterns, but involve low color to color dot placement error in order to generate ideal results. Likewise, example systems described with respect to FIG. 1A recognize that plane independent half-toning processes have a tendency to yield dot clumping and other negative effects. In contrast to plane independent half-toning, in which color planes (e.g., RBG or KCMY) are processed independently for a given pixel, a system 100 of FIG. 1A can implement a half-toning process in which colors are processed sequentially (e.g., from darkest to lightest, for example), and later colors may be dispersed upon the pixel to diffuse resultant null space from a previous color. Among other benefits, such compensation by later colors mitigates dot clumping that may result from plane independent half-toning. A printing system 10 can implement plane dependent half-toning, which can involve, for each pixel, sequential later color planes being "dependent" on the previous color planes (one-way plane dependence), or for colors involving similar properties, causing reverse sequencing such that sequential color planes are dependent on each other (two-way plane dependence).

The printing system 10 can further implement sequential plane dependent error diffusion, which bases sequential color plane processing on error metrics from previous color planes. Such error diffusion processing may be performed one-way or two-way, providing compound corrections to mitigate errors. Thus, the printing system 10 can determine tone dependent error weightings based on the combined tones of the correlated color planes. Tone dependent error weightings may be used by the printing system 10 to diffuse the final accumulated errors for each color plane. However, implementation of such corrective processing can entail additional sensors and processing components, adding to costs, processing requirements, and power requirements. Accordingly, such diffusion methods inflict additional constraints to basic half-toning architecture.

In contrast to the foregoing example, the printing system 10 can implement a hybrid plane dependent half-toning process which modifies an executable half-toning technique by de-asserting plane dependency terms during print job processing or scanning. The printing system 10 can identify a tone value for individual pixels of a print job, and determine whether to implement plane dependence, or whether to de-assert a plane dependence component of the half-toning technique such that the pixel is implemented by plane independence.

Additionally or alternatively, the printing system 10 can include a counter which maintains a tone value tally when processing each color plane sequentially. In accordance with such implementations, when the combined tone value for a given pixel exceeds a threshold value (e.g., a threshold tonal value corresponding to a lightness or darkness of an desired pixel color independent of its chromaticity), the printing system 10 can de-assert a component of plane dependence for the remaining color planes.

With reference to FIG. 1A, the printing system 10 includes a hybrid plane dependent half tone system 100 which utilizes hybrid plane dependence logic in order to mitigate the effects of dot placement error during print job execution. Referring to FIG. 1A, a print, job 104 is received, via a system interface 105, from an external (or internal) print job source 102. The print job 104 may correspond to any file or set of files submitted to the printing system 10 for printing. The print job 104 can include text and color or black & white objects or images requiring half-toning for precise output matching.

The system interface 105 can receive the print job 104 and transmit job data 107 directly to a plane dependence control module 120 of the hybrid plane dependence half tone system 100, which can employ hybrid plane dependence logic in order to determine how to implement plane dependence or plane independence on individual pixels of the print job data 107. In accordance with one or more examples, the plane dependence control module 120 can process the print job data 107 to identify tone values on a per pixel basis. The plane dependence control module 120 can then determine which pixels of the print job data 107 can be more effectively processed without plane dependence. The plane dependence control module 120 can then assert or de-assert plane components of dependence for a given pixel of the print job data 107.

For example, typical printing systems can implement a half-toning architecture, in accordance with half-toning instructions 142, which can inherently include a plane dependence component to mitigate dot placement errors, and output high quality objects and images during execution of the print job 104. However, for richer tones (i.e., pixels involving higher dot density), dot placement errors can compound the effects of dot clumping or non-uniformity and may cause undesirable vertical or horizontal strips in the executed print job. The plane dependence control module 120 can mitigate such undesirable effects by de-asserting aspects of plane dependence for individual pixels involving dot placement density, or tone value, above a predetermined threshold. Accordingly, the plane dependence control module 120 can output print job data 122 with modified half-tone instructions 123 such that plane dependence is not performed for colors with an accumulated tone value above the predetermined threshold, and is performed for colors with accumulated tone values below the predetermined threshold.

The predetermined threshold may be a set tone value having a particular density. This particular density can correspond to a probabilistic determination that dot placement error will result in dot overlap above a certain criteria. In some implementations, the particular density will be such that no dot overlap will result. Alternatively, the particular density will be such that a tolerable amount of dot overlap can occur up to a resultant dot overlap value if plane dependence were implemented. In terms of dot area, the particular density may be selected as ±1 dot, or ±1 square area corresponding to a single dot. In such implementations, an ideal result for a pixel would allow for a null area corresponding to a dot to circumscribe each placed dot. Thus, plane dependence may be implemented on the pixel without significant concern of overlap. Alternatively, the particular density may be selected as anywhere from ±0.1 to ±2, or any other desired value to optimize print quality.

Alternatively still, a particular density may be selected depending on not only the tone value, but also the color value of a given pixel. Accordingly, darker color values with relatively rich tones can be selected to have a lower particular density threshold than lighter colors with rich tones. The basis for such a determination may be that dot clumping is more tolerable with lighter colors (e.g., magenta or yellow) than with darker colors (e.g., black or cyan).

According to one or more examples, entire objects or regions of the print job data 107 may be determined to have tone values above or below the predetermined threshold. In such examples, the plane dependence control module 120 can implement plane dependence or plane independence on entire objects or regions of the print job data 107. Alternatively, a different threshold may be selected for such objects or regions.

The printing system 10 can include a system database 140 including instructions executable based on the print job 104. For example, standard print jobs involving only text may be pre-scanned as such, and the print controller 130 can implement print instructions 143. Additionally, the system database 140 can include half-toning instructions 142 in accordance with a color or grey scale printing scheme for objects and images requiring greater detail.

According to one or more examples, the system interface 105 can receive the print job 104 and transmit the job data 107 to a pre-scan module 110 for initial processing. The job data 107 may correspond to the print job 104 directly, or the system interface 105 can be implemented with service filter logic that can readily identify compatibility of the printer, and/or determine whether printer resources can fulfill the print job 104. The pre-scan module 110 can receive the print job data 107 and perform a scan to identify tone values for individual pixels and/or objects or regions of the print job data 107.

For any given pixel of a print job, dot placement can be performed sequentially over a number of color planes (e.g., CMY, RGB, grey scale, etc.). As an example, the printing system 10 may implement logic to process a given pixel to sequentially disperse darker dots first, and lighter dots last (e.g., KCMY processing). Alternatively, the printing system may implement logic to process the given pixel using the color planes in any order. In accordance with the above examples, the pre-scan module 110 can output pre-scanned tone values 116 to a tone value counter 125, which can perform a dot count corresponding to each color plane of the given pixel. Such color plane counts 126 can be submitted to the pre-scan module 110, which can submit, to the plane dependence control module 120, (i) object count data 114, corresponding to averaged color plane counts for entire objects or regions (e.g., images) of the print job data 107, and/or (ii) pixel count data 112, corresponding to color plane counts for individual pixels of the print job data 107.

The plane dependence control module 120 can receive such object count data 114 and/or pixel count data 112 to determine, on a color plane basis, where to de-assert plane dependence (as discussed with respect to FIG. 5 below). In such implementations, the plane dependence control module 120 can communicate, to a print controller 130, the print job data 122, along with modified half-toning instructions 123, instructing the print controller 130 to process the print job data 122 in accordance with the de-asserted plane dependency. As an example, the modified half-toning instructions 123 can cause the print controller 130 to process the print job to execute the print job data 122 based on either (i) given pixels having a plane dependency component de-asserted as a whole, or (ii) de-assertion of a plane dependency component between sequentially processed color planes of a given pixel. Alternatively, the plane dependence control module 120 can receive the color plane counts 126 directly from the tone value counter 125 and process such counts 126 in conjunction with the pre-scanned tone values 115 for individual pixels and/or objects of the print job data 107.

As an addition or an alternative, the print controller 130 can submit real-time data 132 to the plane dependence control module 120 during print job processing. Such real-time data 132 can correspond to actual dot placement during execution of the print job data 122. Alternatively, the real-time data 132 can correspond to a dot check based on any number of factors. For example, the print controller 130 may run logic taking into account current printing system resources, such as ink levels, and provide information associated with the resources to the plane dependence control module 120 for processing. Error correction logic may be implemented on the plane dependence control module 120 to make real-time adjustments to plane dependency for individual pixels, or between sequentially processed color planes. Accordingly, implementations described herein can provide for automatic correction of de-asserted plane dependency based on printing system resources and/or error correction.

Upon finalizing print job processing, the print controller 130 can submit a final print job 134 to a print engine 145 for execution. The final print job 134 may be submitted to include plane dependence de-assertions for individual pixels and/or between sequential color planes directly from the plane dependence control module 120. Additionally or alternatively, the final print job 134 can include any combined plane dependency de-assertions of individual pixels, between sequential color planes, and any error correction or real-time adjustments based on real-time data 132. Additional error diffusion or correction logic may be implemented on the print engine 145 to further mitigate dot placement error. The resultant print output 147 from the print engine 140 is closely correlated with the initially submitted print job 104 from the print job source 102, with dot placement errors mitigated via the disclosed hybrid plane dependence logic.

PLANE DEPENDENCE CONTROL

Figure 1B:
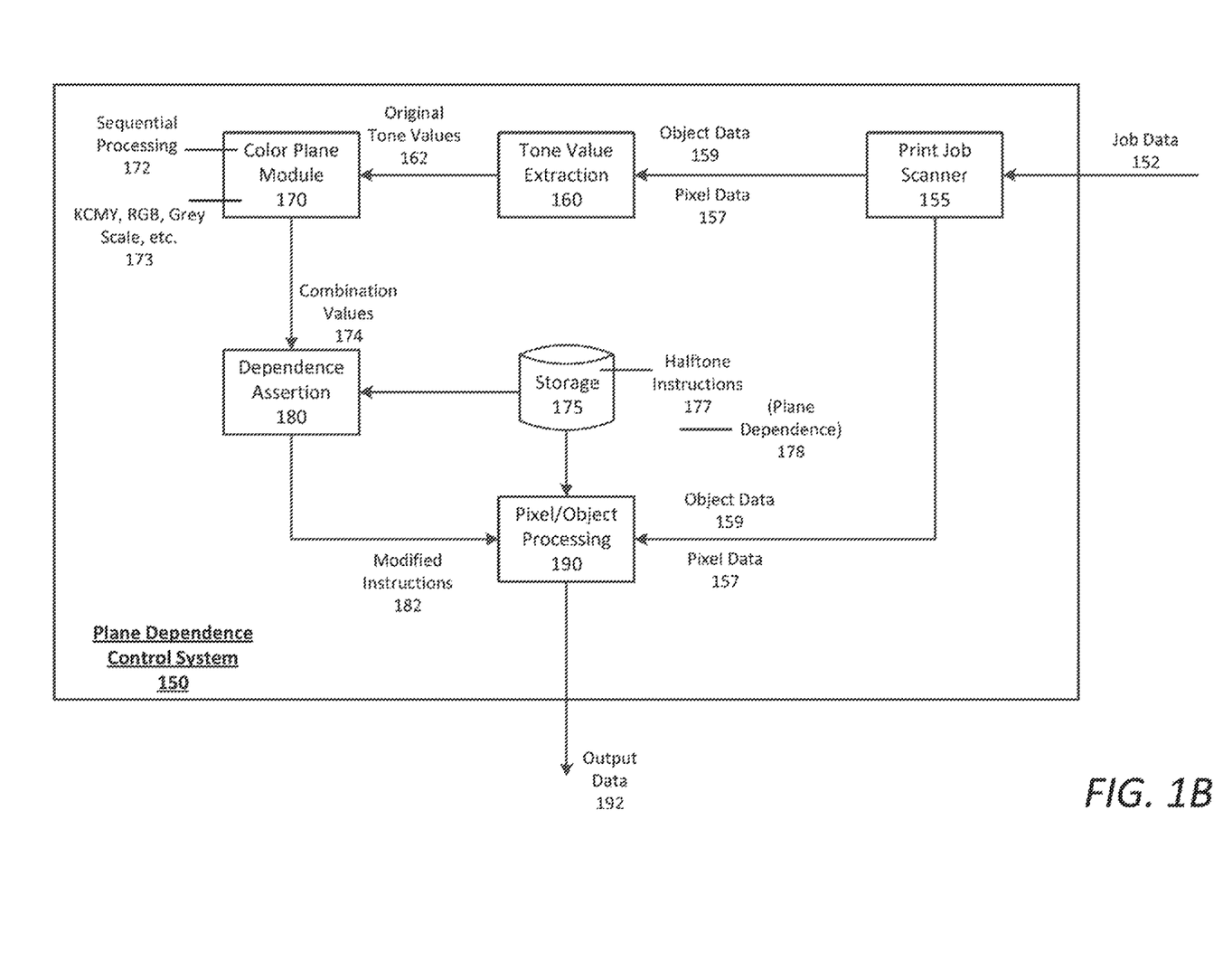
FIG. 1B is an example plane dependence control system as described with one or more examples herein.

FIG. 1B is an example plane dependence control system as described with one or more examples herein. In the below discussion of FIG. 1B, reference may be made to like reference characters representing various features of FIG. 1A for illustrative purposes. Furthermore, the example plane dependence control system 150, as illustrated in FIG. 1B, may be implemented as the plane dependence control module 120, as provided in FIG. 1A and described herein.

Referring to FIG. 1B the plane dependence control system 150 includes a print job scanner 155 that scans received job data 152 corresponding to a print job. The print job scanner 155 can output pixel data 157 and/or object data 159, corresponding to color or grey scale tone data included in the print job data 152. Accordingly, entire objects, regions, or images of the print job data 152 may be scanned and marked, or any number or combination of pixels may be mapped to color tone data to be processed for plane dependency. For example, null space regions of the print job data 152 can be parsed as not including tone criteria, and such regions may be mapped or marked for disregarding. Additionally or as an alternative, the print job scanner 155 can output the pixel data 157 to include tone data for every pixel of the print job data 152.

The print job scanner 155 can submit the pixel data 157 and/or the object data 159 directly to a pixel/object processing unit 190. The plane dependence control system 150 can be implemented in a printing system 10 executing a pre-existing half-toning instruction 177, which can be stored by the control system 150 in a local storage unit 175. The half-toning instruction 177 can include plane dependency components 178, which instruct the print controller 130 how to perform plane dependency on each pixel. More specifically, the plane dependency components 178 instruct the print controller 130 to initiate plane dependency (e.g., one-way and/or two-way) through each sequentially processed color plane (e.g., KCMY) for the given pixel. The pixel/object processing unit 190 can process each object and/or pixel from the pixel data and 157 and the object data 159, and edit the half-toning instruction accordingly.

For example, based on tone data for a given pixel, the pixel/object processing unit 190 can identify that an entire object or region includes tone values well below the predetermined threshold. Such objects or regions may be disregarded, and/or the half-toning technique may run on such objects or regions without modification.

Additionally or alternatively, the pixel/object processing unit 190 can identify those pixels/objects of the print job data 152 having tone values above a predetermined threshold. The pixel/object processing unit 190 can be enabled to process entire objects as a set or grouping of individual pixels, or can process individual pixels separately. Thus, pixel/object processing may be used interchangeably without limiting the scope of the processing unit's function. As a pixel processing unit 190, pixel data 157 is received which can include color tone information or raw tone data for individual pixels of the print job data. The pixel processing unit 190 can determine or identify tone values for the individual pixels and differentiate the pixels based on a predetermined threshold or thresholds.

After differentiating the pixels based on tone value, the pixel processing unit 190 can operate to modify the half-toning instruction 177 implemented on those pixels having a tone value that exceeds a threshold. According to high level examples, the pixel processing unit 190 can de-assert a plane dependence component 178 of the half-toning instruction 177 such that the print controller 130 may implement plane independence on those pixels (tone value ≥(or >) predetermined threshold).

Alternatively, example plane dependence control systems 150 may be included in printing systems 10 executing half-toning techniques that implement plane independence by default. In such examples, the pixel processing unit 190 can parse individual pixels from the pixel data 157 having tone values that do not exceed a predetermined threshold. Accordingly, the pixel processing unit 190 can modify the half-toning instruction 177 to include additional plane dependence components 178 such that the print controller 130 implements plane dependence on those pixels (tone value ≤(or <) predetermined threshold).

Additionally or as an alternative, the plane dependence control system 150 can execute additional functionality to control plane dependency within the sequential color plane process for each pixel. For example, a printing system can execute plane dependent KCMY sequential processing per pixel. In such examples, the plane control system 150 can execute additional logic to modify plane dependency within the KCMY sequential processing architecture.

In accordance with the above examples, the plane dependence control system 150 can further include a tone value extraction unit 160 that can receive the object data 159 and/or pixel data 157 from the print job scanner 155 and extract original tone values 162 (e.g., color densities) for individual pixels. The original tone values 162, based on raw job data 152, can be transmitted to a color plane module 170, which can simulate sequential color plane processing 172 (e.g., KCMY, RGS, or grey scale 173) to determine between which color planes the final printed tone value will exceed a predetermined threshold.

As described above, a predetermined threshold may be a static term with a universal particular density independent of color tone or one-way versus two-way plane dependence. Alternatively, a predetermined threshold may be a dynamic term allowing for unique threshold terms depending on any number of factors. For example, a unique predetermined threshold can be selected for specified individual color tones (e.g., dark blue versus dark green). Furthermore, unique thresholds can be selected based on whether one-way plane dependence is configured for a given pixel, or whether two-way plane dependence is configured. Thus, for closely matching color plane ratios (e.g., 1:1 cyan and magenta), two-way plane dependence may be implemented on the pixel, in which case a unique threshold may be selected based on one or both of the color tone or the two-way plane dependence.

The color plane module 170 can process the original tone values 162 and output combination values 174 to a dependence assertion unit 180. The combination values 174 can correspond to combined tone values after dot placement by each color plane. For illustration, the combination values 174 may correlate a given pixel with a tone value of 176 tone units (tu) (corresponding to arbitrary or actual dot density units), corresponding to 16 for black (K), 32 for cyan (C), 64 for magenta (M), and 64 for yellow (Y). A predetermined threshold of 96 (one way) may be configured on the dependence assertion unit 180 via plane dependency logic. Thus, sequential one-way color plane processing (K→C→M→Y=176 tu) may cause the dependence assertion unit 180 to de-assert plane dependency when the sum of the combined color tone after each sequential color plane exceeds the 96 tu threshold. Accordingly, the dependence assertion unit 180 will modify the half-toning instruction 177 by de-asserting the plane dependence component 178 between the magenta (M) and yellow (Y) color planes, resulting in an overall tone value of 112 tu.

As an addition or alternative, the color plane module 170 may re-order the color planes. As an example, print, data may yield tone values of 128 (K), 16 (C), 32 (M), and 5 (Y). For a threshold of, say, 69 tu, and processed in KCMY order, all plane dependence would be turned off because K is processed first, and exceeds the threshold. In these and similar scenarios, the color plane module 170 may be implemented to re-order sequential processor to, for example, CMYK, and plane dependence turned off between the Y and K color planes. Thus, full plane dependence between the colors and a high fill of independent K is permitted.

Further still, the same or similar concepts described herein may be implemented in various other types of half-toning and plane dependency. For example, plane dependence control may be implemented in conjunction with plane dependent matrix-based half-toning, such as described by, for example, U.S. Pat. No. 6,870,645. Additional examples may implement plane dependence control, as described herein, in conjunction with digital halftone microscreens, such as described in, for example, U.S. Pat. No.

6,839,450. Other implementations of examples described herein in conjunction with half-toning techniques in the art are also contemplated.

Additionally, or alternatively, the color plane module 170 may run a simulation to determine ideal instances during the sequential processing 172 to de-assert the plane dependence term 178 of the half-toning instruction 177. For example, for individual pixels involving tone values above the predetermined threshold, the color plane module 170 can simulate print processing to determine between which color planes the tone value exceeds the predetermined threshold (e.g., between C and M). The color plane module 170 can deliver the combination values 174 based on the simulation, and the dependence assertion unit 180 can determine between which color planes to de-assert plane dependence. Specifically, the dependence assertion unit 180 can de-assert plane dependence between the black and cyan color planes to prevent the tone value from exceeding the predetermined threshold. Alternatively, the dependence assertion unit 180 can de-assert plane dependence between the cyan and magenta color planes, thereby allowing the tone value to exceed the predetermine threshold, but by only one sequential color plane.

Accordingly, the modified instructions 182 with plane dependence de-assertion between sequential color planes can be delivered to the pixel, processing unit 190 to transmit output data 192 to the printer controller 130. The output data 192 can correspond to the job data 152 incorporated with the modified instructions 182. Alternatively, the output data 182 can correspond to mapped individual pixels involving tone values above the predetermined threshold, and correlated modified instructions 182 for those pixels.

While reference has been made to KCMY implementations, examples described herein may be implemented on any arrangement of printer systems executing more than one ink tone. For example, printing systems including only two ink tones of black and grey can utilize plane dependence system examples described herein. Furthermore, printer systems can offer upwards of five, six, or seven ink colors offering many different color tones per pixel. Furthermore, plane dependence may be used between two different drop sizes of the same ink or inks. Such systems can implement plane dependence systems as described herein to mitigate dot placement errors in accordance with the above examples.

METHODOLOGY

Figure 2A:
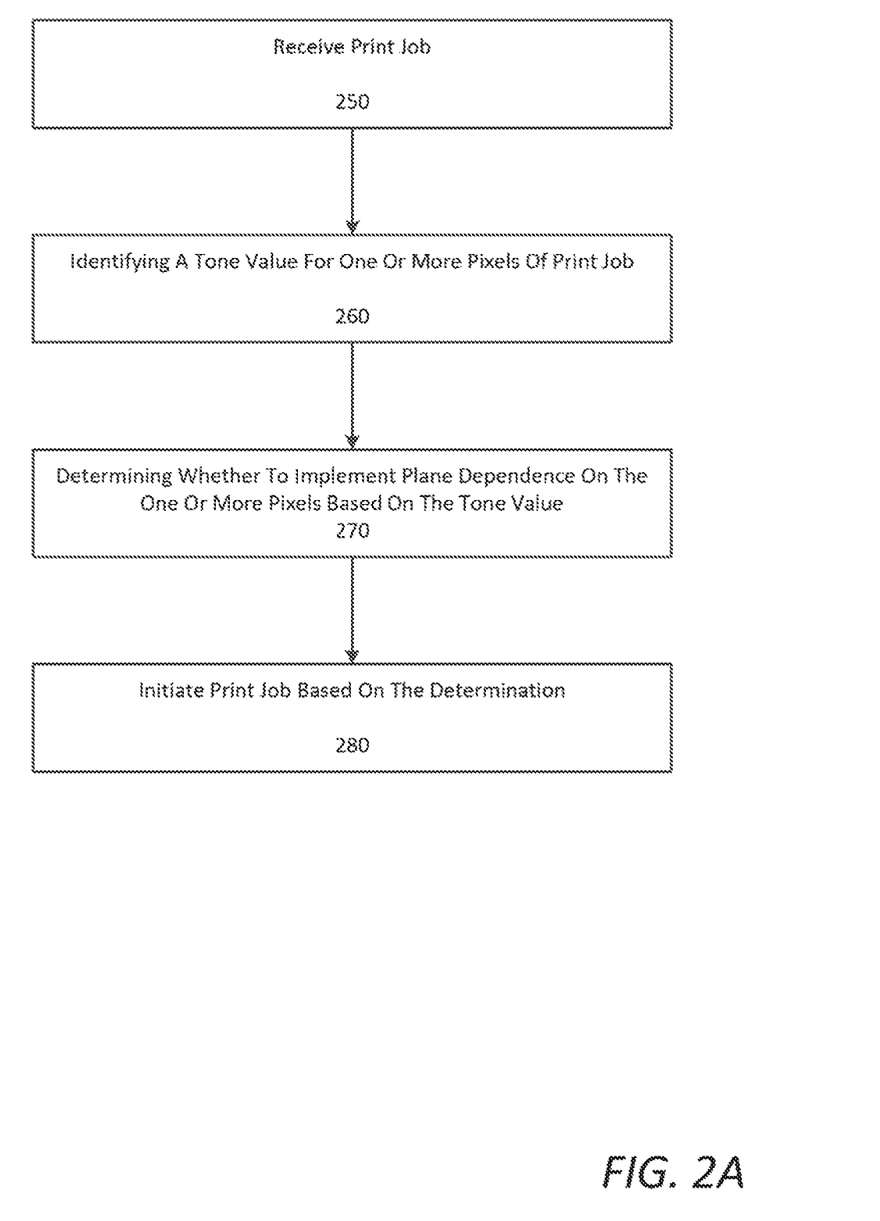
FIG. 2A is an example method of mitigating dot placement errors using hybrid plane dependent half-toning.

FIG. 2A is an example method of mitigating dot placement errors using hybrid plane dependent half-toning. In the below discussion of FIG. 2A, reference may be made to like reference characters representing various features of FIGS. 1A and 1B for illustrative purposes. Referring to FIG. 2A, the printing system 10 receives a print job (250). Based on the print job, the plane dependence control module 120 can identify a tone value for any number of pixels of the print job (210). Based on the identified tone values, the plane dependence control module 120 can determine how to implement plane dependence on each of the pixels (270). Once the plane dependence control module 120 determines how to implement plane dependence on the pixels, the print job may be initiated (280).

Figure 2B:
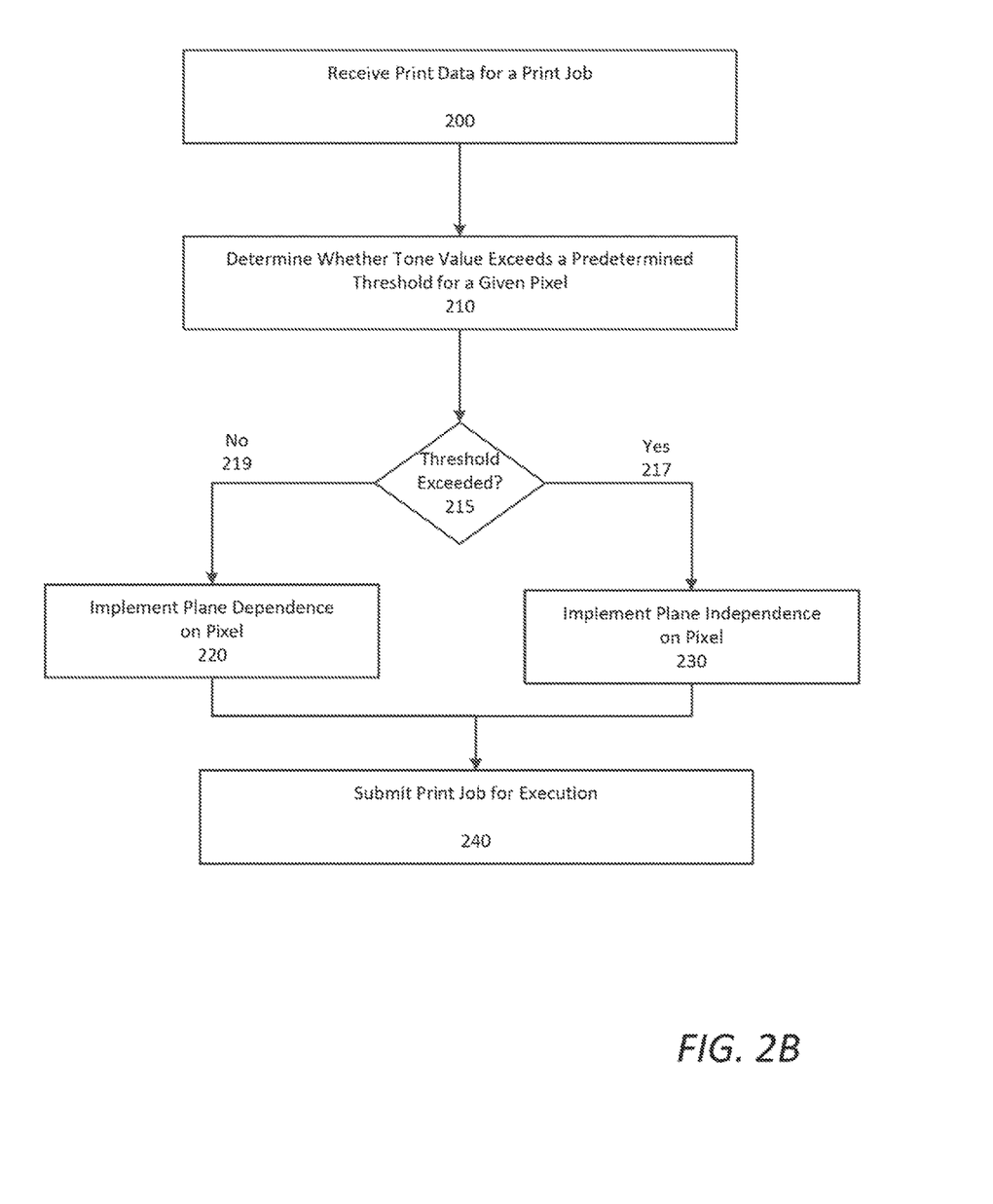
FIG. 2B is another example method of mitigating dot placement errors using hybrid plane dependent half-toning.

FIG. 2B is another example method of mitigating dot placement errors using hybrid plane dependent half-toning. In the below discussion of FIG. 2B, reference may be made to like reference characters representing various features of FIGS. 1A and 1B for illustrative purposes. Referring to FIG. 2B, the printing system 10 receives a print job, or print data corresponding to the print job (200). Based on the print data, the plane dependence control module 120 can make a determination as to whether a tone value exceeds a predetermined threshold (210). The plane dependence control module can make this determination for individual pixels of the print job, or can combine any number of pixels (e.g., objects, null space, image space) to determine areas in which tone values clearly do not exceed the predetermined threshold.

At decision block 215, the determination is made regarding whether a predetermined threshold is exceeded. As discussed above, a predetermined threshold may a universal dot density applied to all pixels regardless of color tone. Alternatively, a predetermined threshold may be unique to various scenarios depending on color tone and/or one-way versus two-way plane dependency. If a predetermined threshold is exceeded (217), the plane dependence control module 120 can implement plane independence or partial plane dependence for the given pixel (230). Plane independence can be implemented on a pixel by de-asserting a plane dependence component 178 of an existing half-toning instruction 177.

Otherwise, if a predetermined threshold is not exceeded (219), then the plane dependence module 120 can implement plane dependence on the given pixel (220). Plane dependence may be implemented by simply disregarding the given pixel and allowing the current half-toning instruction 177 to execute on the given pixel. However, for printing systems 10 executing plane independent half-toning instructions, the plane dependence control module 120 can insert a plane dependency term in order to actively assert plane dependence on the given pixel.

Once the individual pixels of the print job are processed for plane dependency, the modified print job is submitted to the print controller 130 for execution (240).

Figure 3:
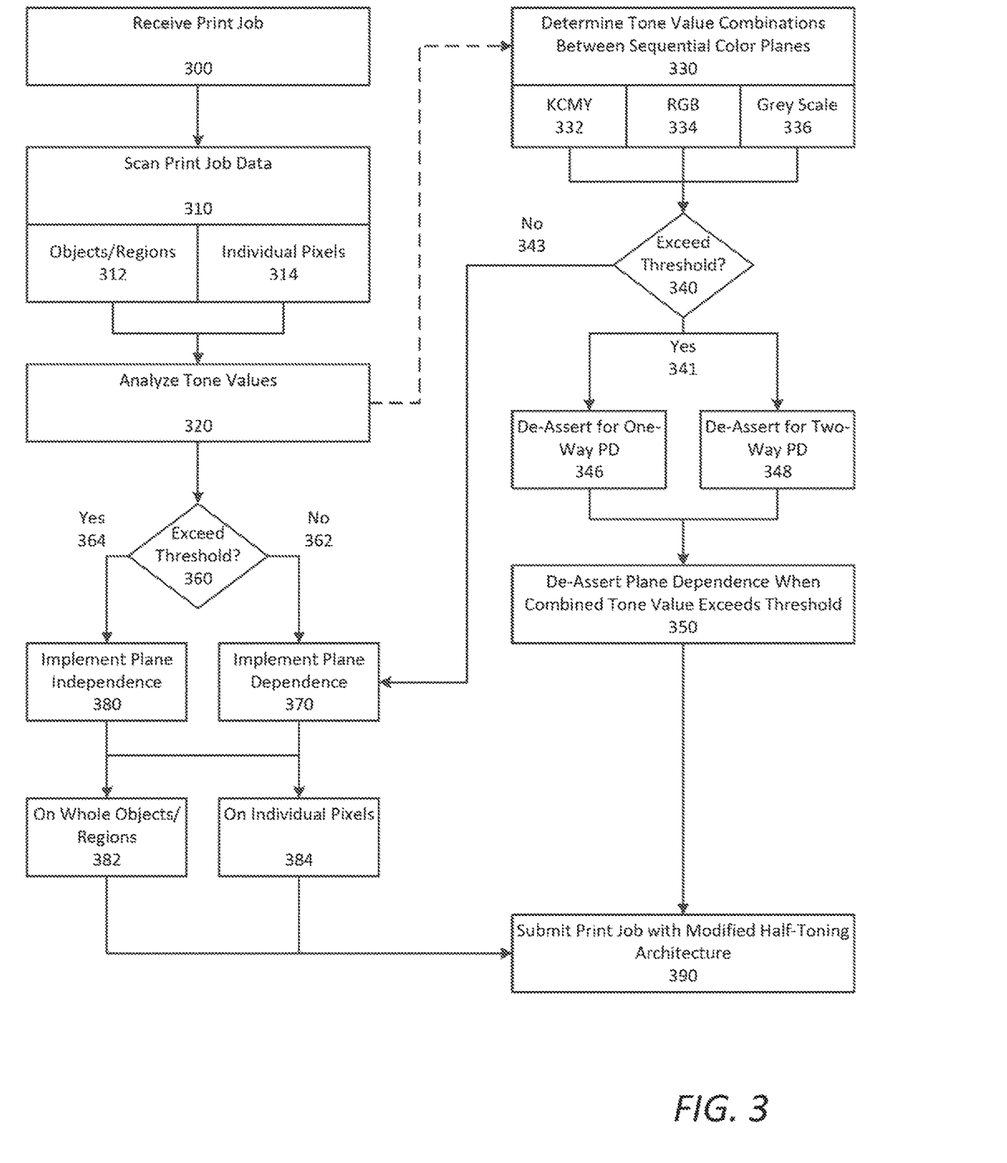
FIG. 3 is an example method of mitigating dot placement errors using hybrid plane dependent half-toning in which control of plane dependence is also utilized.

FIG. 3 is an example method of mitigating dot placement errors using hybrid plane dependent half-toning in which control of plane dependence is also utilized. In the below discussion of FIG. 3, reference may further be made to like reference characters representing various features of FIGS. 1A and 1B for illustrative purposes. Referring to FIG. 3, a print job is received from a source device (300). The print job can include raw print data indicating ideal tone values over a given page or image. The print job data can be scanned (310) by the print job scanner 155 to extract pixel data 157 (314) and/or object data 159 (312). As such, the print job scanner 155 can output pixel data 157 to a tone value extraction unit 160 which can analyze tone values for individual pixels of the print job (320), and output such values to the pixel processing unit 190.

In accordance with the high level method discussed with respect to FIGS. 2A-2B, the pixel processing unit 190 can, on a pixel by pixel basis, directly determine whether pixels exceed the predetermined threshold, at decision block 360. If the tone value for the given pixel does not exceed the predetermined threshold (362), the plane dependence is implemented on the pixel (370). However, if the tone value for the given pixel does exceed the predetermined threshold (364), then plane independence is implemented on the given pixel (380). As discussed above, plane independence can be implemented on the pixel by de-asserting the plane dependency components 178 of an existing half-toning instruction 177.

Furthermore, in accordance with one or more examples, the pixel/object processing unit 190 can assert or de-assert plane dependence on whole objects or regions of the print job (382), and/or on an individual pixel basis (384). Accordingly, once the individual pixels of the print job are processed, the pixel processing unit 190 can submit the print job with the half-toning architecture customized or modified on a pixel by pixel basis (390).

Further still, subsequent to or in conjunction with tone value analysis (320), original tone values 162 for individual pixels can be outputted to a color plane module 170 for sequential color plane processing. According to examples, the color plane module 170 can determine tone value combinations between sequential color planes (330). Depending on the printing system, the color plane module 170 can determine such combination values between color planes for KCMY (332), RGB (334), grey scale (utilizing two or more black or grey ink tones) (336), or any printer system utilizing multiple ink cartridges. Such combination values 174 may then be submitted to the pixel processing unit 190, which can determine whether, at any point during the sequential color plane processing, the predetermined threshold is exceeded, at decision block 340.

If the predetermined threshold is not exceeded over the course of the entire sequential processing (343), then the pixel processing unit 190 implements plane dependence on the given pixel (370). However, if the predetermined threshold is exceeded at any point throughout the sequential color plane process (341), then plane independence is implemented at the relevant point (e.g., between individual color planes) of the sequential process.

Additionally or as an alternative, the plane dependence control system 150 can take into account factors such as directional plane dependency (i.e., one-way or two-way). Accordingly, for one-way plane dependency, the plane dependence control system 150 can de-assert the plane dependence components 178 of the half-toning instruction 177 between sequential color planes in a unidirectional manner (346). However, bidirectional de-assertion may be implemented by the plane dependence control system 150 for two-way plane dependency (348). For example, the predetermined tone value may be exceeded between a lighter color plane (e.g. yellow) and a darker color plane (e.g. magenta) in a reverse sequential manner—that is, after the initial sequential processing of the darker color plane. In such instances, de-assertion of the plane dependence components 178 may be executed between the lighter and darker color planes in a reverse sequential manner based on the two-way plane dependence.

In accordance with the above examples, and for both one-way and two-way plane dependence, the plane dependence control system 150 de-asserts the plane dependence components 178 of the existing half-toning instruction 177 when the combined tone value exceeds the predetermined threshold (350). Thus, after individual pixels and/or objects are processed by the plane dependence control system 150, the print job is submitted to the print controller with the modified half-toning architecture (390).

HARDWARE DIAGRAM

Figure 4:
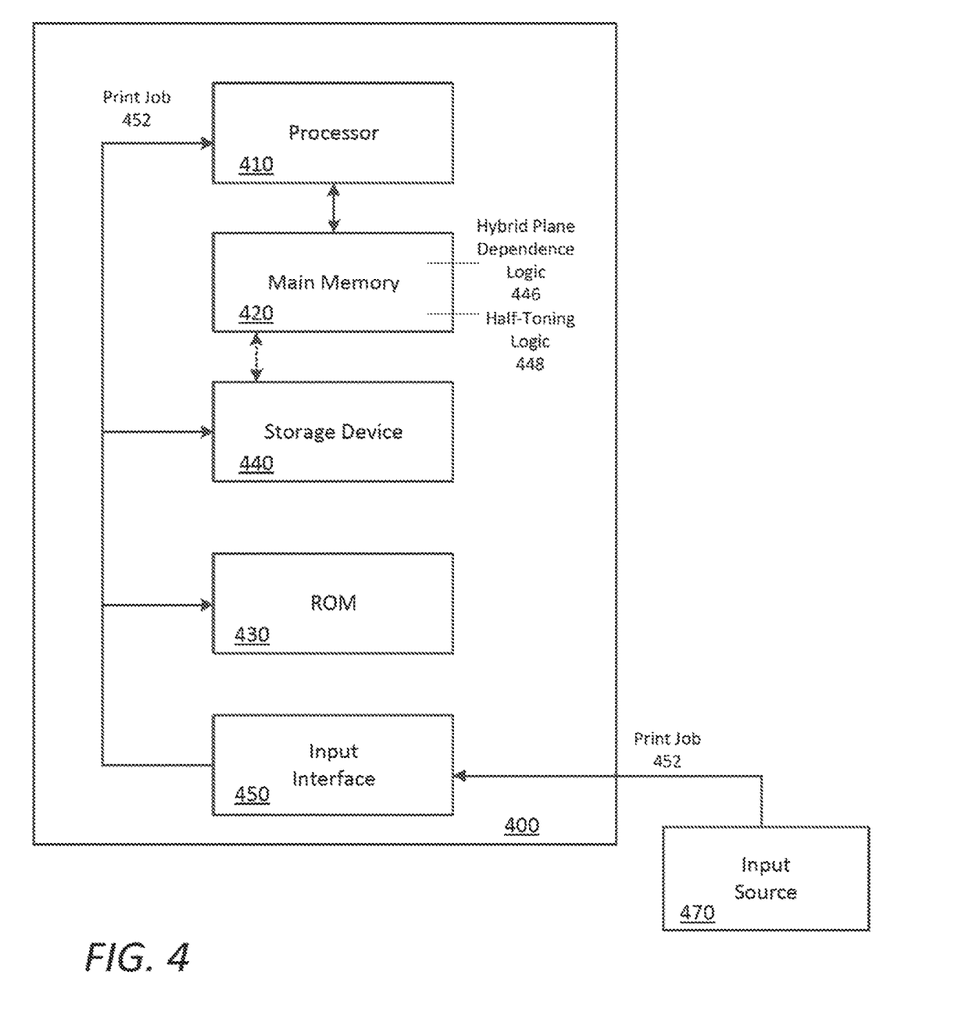
FIG. 4 is an example computer system upon which examples described herein may be implemented.

FIG. 4 is an example computer system upon which examples described herein may be implemented. For example, in the context of FIGS. 1A and 1B, the hybrid plane dependent half-toning system 100 and/or plane dependence control system 150 may be implemented using a computer system 400 such as described by FIG. 4. The hybrid plane dependent half-toning system 100 and/or the plane dependence control system 150 may also be implemented using a combination of multiple computer systems as described by FIG. 4. Accordingly, any of the functions described in relation to the examples discussed herein may be implemented by such a computer system 400 in hardware, or a combination of hardware and instructions, as described above.

In one implementation, the computer system 400 can include processing resources 410, a main memory 420, ROM 430, a storage device 440, and a communication interface 450. The computer system 400 includes at least one processor 410 for processing information and a main memory 420, such as a random access memory (RAM) or other dynamic storage device, for storing information and instructions to be executed by the processor 410. The main memory 420 also may be used for storing temporary variables or other intermediate information during execution of instructions to be executed by the processor 410. A storage device 440, such as a magnetic disk or optical disk, can be provided for storing information and instructions. For example, the storage device 440 can correspond to a computer-readable medium that can include hybrid plane dependence logic 446 and half-toning logic 448 for performing operations discussed with respect to FIGS. 1-3.

The input interface 450 can enable computer system 400 to communicate with an input source 470 (e.g., a computing device) through use of an input link (wireless or wireline). The input source 470 can be external to the computer system 400, or alternatively, internal to the computer system 400 such that processes described may be performed within the computer system prior to outputting to a printing system 10. The processor 410 can process the print job 452 (e.g., print signal incorporating print data therein) to control half-toning, specifically a plane dependence component of the half-toning logic 448 as described herein.

Examples described herein are related to the use of computer system 400 for implementing the techniques described herein. According to one example, those techniques are performed by computer system 400 in response to processor 410 executing sequences of instructions contained in main memory 420, such as the half-toning logic 448 and/or the hybrid plane dependence logic 446. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

Figure 5:
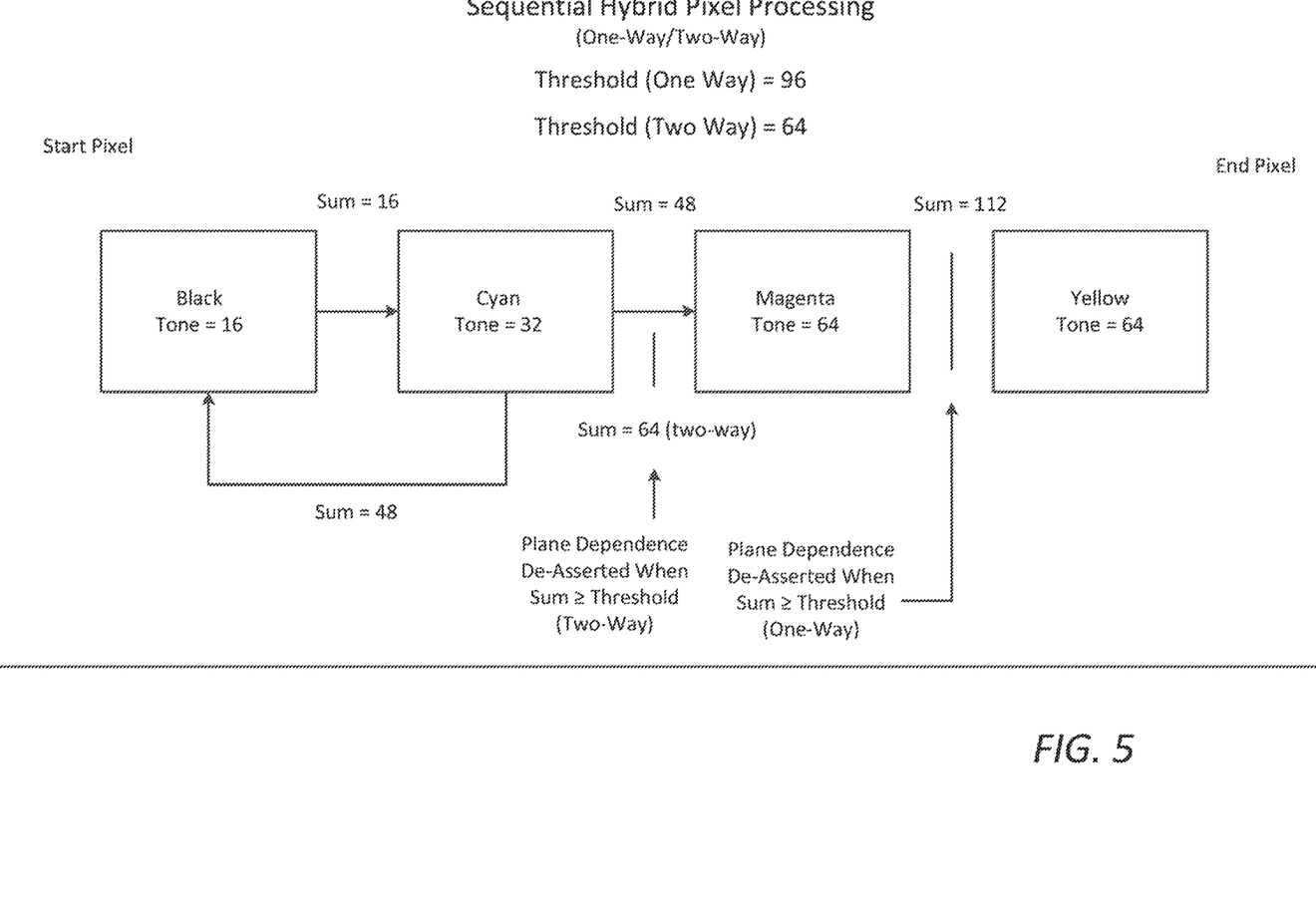
FIG. 5 illustrates example sequential color plane processes for a given pixel utilizing one-way and two-way plane dependency.

FIG. 5 illustrates example sequential color plane processes for a given pixel utilizing one-way and two-way plane dependency. Examples discussed with respect to FIG. 5 may be performed by, for example, the color plane module 170 as shown in FIG. 1B. With reference to FIG. 5, sequential one-way color plane processing is illustrated for a given pixel in which a predetermined threshold of 96 tu is selected for plane dependency. For illustrative purposes, FIG. 5 depicts sequential processing for a KCMY implementation. However, the disclosure is not limited to only KCMY processes, but rather may be performed for any printing system utilizing multiple ink tones. For the specified pixel, the sequential processing is started from darkest to lightest (i.e., KCMY), however alternative sequences are contemplated (e.g., CMY, CMYK, lightest to darkest, grey tones, etc.) in which, for example, the color plane module 170 may re-order the sequence in which color planes are processed.

In the given example, pixel data can indicate that 16 tu of black, 32 tu of cyan, 64 tu of magenta, and 64 tu of yellow are used to output an ideal color for the pixel. However, due to dot placement error, achieving this ideal color without error is largely impracticable. For example, attempting to achieve such an ideal color tone via standard plane dependence through each color plane can compound errors and cause blotchiness, horizontal and vertical lines, and dot clumping on a large scale. Thus, estimations within reasonable error limits can be implemented to mitigate such compounding effects and output an effective alternative. Hence, a threshold of 96 tu for one-way plane dependence may be selected as an optimal threshold to, maximize pixel quality while minimizing dot placement error.

As shown in the one-way plane dependent sequential process of FIG. 5, a sum of 16 tu results from K processing, a combined sum of 48 tu results from the combination of K and C, a sum of 112 tu results from the combination of K, C, and M and a total sum of 176 tu is used to achieve ideal color tone for the pixel. In accordance with the example described, plane dependency can be de-asserted between the M and Y color planes, resulting in a total one-way tone value of 112 tu for the pixel. This is substantially less than the ideal value of 176 tu, however, the probability of compounding dot placement errors is reduced significantly. Alternatively, plane dependence may be de-asserted between the C and M color planes to further reduce dot placement errors. Yet, with lower toner values or premature de-assertion the system can quickly diverge from the ideal result.

For implementations involving two-way plane dependence, as shown in FIG. 5, the K color plane may depend on C and vice versa, whereas for one way plane dependence, only C can depend on K. Thus, given, for example, a two-way plane dependency threshold of 96 tu, pixel data may indicate two-way dependence is ideal between K and C in order to achieve the ideal result. Thus, sequential processing proceeds with a sum of 16 tu after K, 48 tu after C, and 64 tu after C. Since the threshold is reached between C and M, plane dependence can be de-asserted between C and M. Alternatively, if de-assertion is to be selected based on data indicating that the tone value be less than the threshold value, then plane dependency may be de-asserted between C and K on the second iteration, resulting in a tone value of 48 tu. Alternatively still, if tolerances allow for the tone value to be greater than the threshold value, then plane dependency may be de-asserted between M and Y, resulting in a tone value of 112 tu.

Although illustrative examples have been described in detail herein with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

What is claimed is:

1. A non-transitory computer readable medium storing instructions for mitigating dot placement errors for a print job, wherein the instructions, when executed by a processor of a computing system, cause the computing system to perform operations comprising:
   receiving the print job;
   identifying a tone value for a pixel of the print job;
   based on a comparison between the identified tone value and a threshold corresponding to a probabilistic likelihood that dot placement error will result in intolerable dot overlap if plane dependence were implemented, implementing the plane dependence or plane independence to mitigate dot placement error; and
   causing printing of the print job in which the plane dependence or the plane independence has been implemented based on the comparison between the identified tone value and the threshold.

2. The non-transitory computer readable medium of claim 1, wherein, based on the comparison between the identified tone value and the threshold, implementing the plane dependence or the plane independence:
   when the tone value for pixel, exceeds the threshold, implementing the plane independence for the pixel; and
   when the tone value does not exceed the threshold, implementing the plane dependence for the pixel.

3. The non-transitory computer readable medium of claim 2, wherein implementing the plane independence comprises at least partially de-asserting a plane dependence component of a half-toning instruction executable on the print job.

4. The non-transitory computer readable medium of claim 2, wherein the threshold is based on a particular density of dots for the respective pixel, the particular density corresponding to a field percentage of dots on the pixel in which a dot placement error results in significant dot overlap for the computing system.

5. The non-transitory computer readable medium of claim 1, wherein the pixel is one of a plurality of pixels corresponding to an object or a region of the print job.

6. The non-transitory computer readable medium of claim 5, wherein the instructions, when executed by the processor, cause the computing system to perform further operations comprising:
   based on an overall tone of the object or region, determining whether to implement the plane dependence for a whole of the object or region.

7. The non-transitory computer readable medium of claim 6, wherein the determination whether to implement plane dependence for the object or region of the print job comprises:
   when the overall tone value exceeds the threshold, implementing the plane independence for the object or region; and
   when the overall tone value does not exceed the threshold, implementing the plane dependence for the object or region.

8. The non-transitory computer readable medium of claim 1, wherein, based on the comparison between the identified tone value and the threshold, implementing the plane dependence or the plane independence:
   determining whether a combined tone value for the pixel exceeds the threshold between each of a number of sequentially processed color planes.

9. The non-transitory computer readable medium of claim 8, wherein the instructions, when executed by the processor, cause the computing system to perform further operations comprising:
   when the combined tone value exceeds the threshold at a respective one of the sequentially processed color planes, implementing the plane independence after the respective color plane; and
   when the combined tone value does not exceed the threshold at the respective color plane, implement the plane dependence and proceed to a next one of the sequentially processed color planes.

10. The non-transitory computer readable medium of claim 8, wherein the sequentially processed color planes comprise a black (K) color plane, a cyan (C) color plane, a magenta (M) color plane, and a yellow (Y) color plane, the respective color plane being one of the K, C, M, or Y color planes, and wherein the computing device is to sequentially process the K, C, M, and Y color planes in one of a number of sequential orders.

11. The non-transitory computer readable medium of claim 10, wherein determining whether the combined tone value exceeds the threshold comprises tallying the combined tone value in the sequential order.

12. The non-transitory computer readable medium of claim 1, wherein the printing system utilizes a page wide array print bar to execute the print job.

13. The non-transitory computer readable medium of claim 1, wherein the printing system utilizes a scanning print head to execute the print job.

14. A computer implemented method for mitigating dot placement errors for a print job, the method being performed by a processor of a computing system and comprising:
   receiving the print job;
   identifying a tone value for pixel of the print job;
   comparing the identified tone value to a threshold corresponding to a probabilistic likelihood that dot placement error will result in intolerable dot overlap if plane dependence were implemented;
   responsive to the identified tone value not exceeding the predetermined threshold, implementing the plane dependence for the respective pixel;
   response to the identified tone value of the respective pixel exceeding the predetermined threshold, implementing plane independence for the respective pixel to mitigate dot placement error; and
   after implementing the plane dependence or the plane independence, causing printing of the print job in which the plane dependence or the plane independence has been implemented.

15. A computing system for mitigating dot placement errors for a print job, the system comprising:
   a processor; and
   a memory resource storing instructions that, when executed by the processor, cause the computing system to perform operations comprising:
      receiving the print job;
      identifying a tone value for a pixel of the print job;
      based on comparison between the identified tone value and a threshold corresponding to a probabilistic likelihood that dot placement error will result in intolerable dot overlap if plane dependence were implemented, implementing the plane dependence or plane independence to mitigate dot placement error; and
      causing printing of the print job in which the plane dependence or the plane independence has been implemented based on the comparison between the identified tone value and the threshold.

* * * * *